(No Model.)

A. E. CLAUSSEN.
VELOCIPEDE.

No. 433,852.  Patented Aug. 5, 1890.

Witnesses.
G. B. Towles.
A. Ruppert.

Inventor.
Alexander E. Claussen
Per
Thomas P. Simpson
Atty.

UNITED STATES PATENT OFFICE.

ALEXANDER E. CLAUSSEN, OF SCOTTVILLE, ILLINOIS.

VELOCIPEDE.

SPECIFICATION forming part of Letters Patent No. 433,852, dated August 5, 1890.

Application filed April 19, 1890. Serial No. 348,655. (No model.)

*To all whom it may concern:*

Be it known that I, ALEXANDER E. CLAUSSEN, a citizen of the United States, residing at Scottville, in the county of Macoupin and State of Illinois, have invented certain new and useful Improvements in Propulsion by Hand and Foot; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a tricycle on which the weight of the rider may be combined with his muscular power in arms and legs, thus utilizing all possible forces in propulsion, while the feet are used to steer the vehicle.

Figure 1:
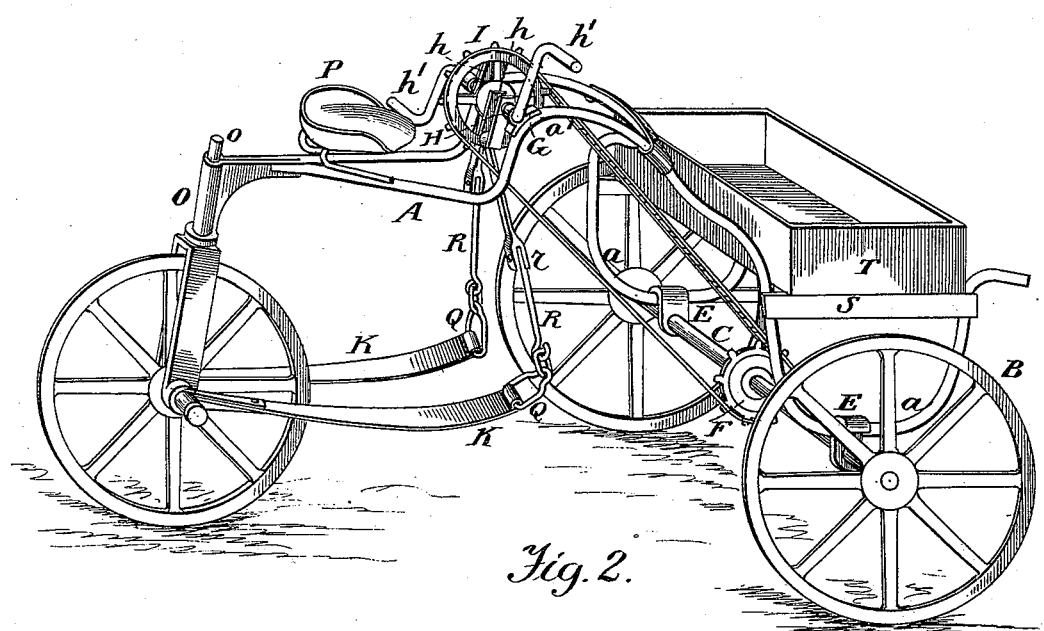
Figure 2:
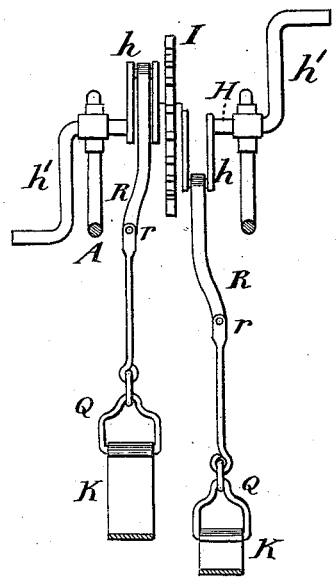

Figure 1 of the drawings is a perspective view, and Fig. 2 a detail view, of the crank-shaft with its sprocket-wheel and stirrup connections.

In the drawings, A represents the frame supported on the two front wheels B B, which are fast on the axle C that turns in bearings E E on the lowest part of the convexity $a$, said axle being rotated by the sprocket-wheel F. On the highest convexity $a'$ of the frame, or a little behind the highest point thereof, I locate the bearings G G, in which rotates the shaft H, which has the opposite cranks $h$ $h$ and corresponding crank-handles $h'$ $h'$. Between the cranks $h$ $h$ is placed the fast sprocket-wheel I, preferably made integral with the shaft. The sprocket-wheels F I are connected in the usual manner by a sprocket-chain J, so that when the shaft H is rotated by the handles $h'$ $h'$ the front axle and wheels will be propelled and the vehicle will move forward.

K K are treadles pivoted, one on each side of the rear wheel L, to the short axle M, which is connected by a bifurcated post N with the tube O attached by a shank $o$ to the rear end of the frame A.

The rider sits on the seat P, grasps the crank-handles $b'$ $b'$ with his hands, and puts his feet in stirrups Q Q, which connect the treadles K with the crank-wheel rods R R. He can then not only throw all his muscular power into the work of propulsion, but also his weight, which will be sufficient of itself to propel the vehicle on a level or down a hill, thus holding his muscular strength in reserve for emergencies and traveling uphill. The rear-wheel post being swiveled and the rods R R being jointed at $r$, just below the sprocket-wheel I, the rider can easily guide the vehicle by simply moving his feet in the stirrups to the right or to the left. Across the concavity of the part $a$ of the frame I throw two cross-bars S S, secure them to the frame, and fasten upon them a body T, which will serve to carry anything of moderate weight.

What I claim as new, and desire to protect by Letters Patent, is—

The combination, with the front axle having fast sprocket-wheel F, the sprocket-chain, and the sprocket-wheel I, of the double-cranked shaft H, having crank-handles $h'$ $h'$, the stirrup-connections R R, jointed at $r$, the stirrups Q, treadles K, pivoted to the rear axle, and the rear wheel L, arranged in a swiveled axle-post, whereby the arms and legs may both be used to propel and the feet to steer the vehicle, as described.

In testimony whereof I affix my signature in presence of two witnesses.

ALEXANDER E. CLAUSSEN.

Witnesses:
J. A. FLETCHER,
PETER F. CLARK.